United States Patent [19]

Yamato et al.

[11] Patent Number: 4,853,435

[45] Date of Patent: Aug. 1, 1989

[54] PROCESS FOR PREPARING THERMOSETTING RESIN

[75] Inventors: Motoyuki Yamato, Kanagawa; Susumu Ueno, Tokyo; Kin-ichi Okumura; Masao Fuchi, both of Okayama, all of Japan

[73] Assignee: Nippon Zeon Co., Ltd., Tokyo, Japan

[21] Appl. No.: 171,721

[22] Filed: Mar. 22, 1988

[30] Foreign Application Priority Data

Mar. 23, 1987 [JP] Japan .................................. 62-65672

[51] Int. Cl.$^4$ ...................... C08F 277/00; C08L 45/00
[52] U.S. Cl. .................................... 525/193; 525/290; 525/245
[58] Field of Search ................ 525/211, 290, 193, 245

[56] References Cited

U.S. PATENT DOCUMENTS

| | | | |
|---|---|---|---|
| 4,357,449 | 11/1982 | Yi | 525/211 |
| 4,400,340 | 8/1983 | Klosiewicz | 525/211 |
| 4,703,098 | 10/1987 | Matlack | 526/283 |

*Primary Examiner*—John C. Bleutge
*Assistant Examiner*—David Buttner
*Attorney, Agent, or Firm*—Nestor W. Shust; George A. Kap

[57] ABSTRACT

A thermosetting resin of a norbornene monomer is prepared by bulk-polymerizing a norbornene monomer in a mold in the presence of a metathesis catalyst system and further in the presence of a dicyclopentadiene heat-polymerized resin in an amount of 15 to 150 parts by weight per 100 parts by weight of the monomer.

10 Claims, No Drawings

PROCESS FOR PREPARING THERMOSETTING RESIN

BACKGROUND OF THE INVENTION

(1) Field of the Invention

The present invention relates to a process for preparing a thermosetting resin by bulk-polymerization of a norbornene monomer. More particularly, it relates to a process for the preparation of a thermosetting resin having an improved modulus of elasticity, an excellent adaptability to the molding operation and an excellent filler dispersibility without reduction of the heat distortion temperature.

(2) Description of the Related Art

The process for ring-opening polymerization of a norbornene monomer such as dicyclopentadiene or methyltetracyclodecene in a mold is known. It also is known that a polymeric modifier such as an elastomer is made present at this polymerization.

For example, Japanese Unexamined Patent Publication No. 58-129,013 (=U.S. Pat. No. 4,400,340) discloses a process for preparing a thermosetting dicyclopentadiene (DCP) homopolymer by the reaction injection molding method (RIM method) using a metathesis catalyst system. According to a preferred embodiment of this process, the homopolymer is prepared by combining two solutions, that is, one solution consisting of a mixture of a catalyst component of the metathesis catalyst system such as a tungsten halide or tungsten oxyhalide and a DCP monomer and another solution consisting of an activator of the metathesis catalyst system such as an alkylaluminum halide and a DCP monomer, in a reaction injection molding (RIM) machine and casting the mixture into a mold. It is taught that an elastomer is added for improving the impact strength of the polymer, and in the examples, it is taught that an elastomer and a small amount (10% by weight) of a heat-polymerized dicyclopentadiene are used in combination.

Japanese Unexamined Patent Publication No. 59-51,911 (U.S. Pat. No. 4,426,502) discloses a process for bulk ring-opening polymerization of a cyclic olefin containing a norbornene ring according to the RIM method using a methathesis catalyst system. Use of an alkoxyalkylaluminum halide or aryloxyalkylaluminum halide as a cocatalyst (i.e., activator) for prolonging the pot life in this bulk polymerization process is proposed. Also in this bulk polymerization process, it is taught that an impact strength improver or the like is incorporated in a monomer-containing reaction liquid, and a specific example is disclosed in which dimethyltetracyclododecene is used as the monomer, a hydrogenated styrene/butadiene/ styrene block copolymer is added as the impact strength improver and a molded article is obtained by carrying out ring-opening polymerization in a mold.

Ring-opened polymers prepared according to these known processes have relatively satisfactory physical properties required for engineering plastics, such as impact resistance, high modulus of elasticity and heat resistance, but they are still insufficient in view of severe requirements these days. For example, if a filler such as a glass fiber is added, the flexural modulus of elasticity of the polymer can be increased, but the impact resistance is degraded, and since the viscosity of the monomer-containing reaction liquid is low, the dispersibility of the filler is often degraded because of precipitation during the reaction. If an elastomer is added for improving the impact resistance, the flexural modulus of elasticity tends to be degraded (see Japanese Unexamined Patent Publication No. 58-129,013).

SUMMARY OF THE INVENTION

We made investigations with a view of eliminating the foregoing defects and as the result, it was found that in the process for preparing a thermosetting resin by bulk polymerizing a norbornene monomer in a mold having a predetermined shape in the presence of a metathesis catalyst, if a dicyclopentadiene heat-polymerized resin is made present in an amount relatively large to the norbornene monomer, a thermosetting resin having improved flexural modulus of elasticity, filler dispersibility and molding operation adaptability with a glass transition point retained at a high level can be obtained. We have now completed the present invention based on this finding.

More specifically, in accordance with the present invention there is provided a process for the preparation of a thermosetting resin, which comprises bulk-polymerizing a norbornene monomer in a mold in the presence of a metathesis catalyst system, characterized in that the polymerization reaction is carried out in the presence of a dicyclopentadiene heat-polymerized resin in an amount of 15 to 150 parts by weight per 100 parts by weight of said monomer.

DESCRIPTION OF THE PREFERRED EMBODIMENTS

The essential elements of the present invention will now be described in detail.

Norbornene Monomer

As the norbornene monomer to be bulk-polymerized according to the process of the present invention, there can be mentioned substituted and unsubstituted norbornene, dicyclopentadiene, dihydrodicyclopentadiene, tricyclopentadiene, tetracyclopentadiene and tetracyclododecene. As specific examples, there can be mentioned dicyclopentadiene, methyltetracyclododecene, 2-norbornene, 5-methyl-2-norbornene, 5,6-dimethyl-2-norbornene, 5-ethyl-2-norbornene, 5-butyl-2-norbornene, 5-hexyl-2- norbornene, 5-octyl-2-norbornene and 5-dodecyl-2- norbornene. Of these monomers, dicyclopentadiene is especially preferred because it gives a thermosetting resin having a high transition point (Tg) and a good fexural modulus of elasticity and this monomer is cheap.

Metathesis Catalyst System

The kind of the catalyst used in the present invention is not particularly critical, and any of known metathesis catalyst systems for bulk polymerization of norbornene monomers (for example, metathesis catalyst systems disclosed in Japanese Unexamined Patent Publication Nos. 58-127,728, 58-129,013, 59-51,911, 60-79,035, 60-186,511 and 61-126,115) can be used without any limitation.

As the metathesis catalyst, there can be mentioned halides, oxyhalides, oxides and organic ammonium salts of tungsten, molybdenum and tantalum. As preferred examples, there can be mentioned tungsten compounds such as tungsten hexachloride, tungsten oxytetrachloride, tungsten oxide, tridecylammonium tungstate, methyltricaprylcaprylammonium tungstate, tri(tridecyl)ammonium tungstate and trioctylammonium tungstate;

molybdenum compounds such as molybdenum pentachloride, molybdenum oxytrichloride, tridodecylammonium molybdate, methyltricaprylammonium molybdate, tri(tridecyl)ammonium molybdate and trioctylammonium molybdate; and tantalum compounds such as tantalum pentachloride. A preferable catalyst is soluble in the norbornene monomer used for the reaction. Use of an organic ammonium salt is recommended from this viewpoint. Where the catalyst used is a halide, the catalyst can be solubilized by treating it with an alcoholic or phenolic compound in advance. Lewis bases such as benzonitrile and tetrahydrofuran and chelating agents such as acetylacetone and alkyl acetoacetates can be used for preventing premature polymerization.

As the activator (i.e., cocatalyst), there can be mentioned alkylaluminum halides, alkoxyalkylaluminum halides, aryloxyalkylaluminum halides and organic tin compounds. As preferred examples, there can be mentioned ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichlorode, methylaluminum sesquibromide, tetrabutyltin and an alkylaluminum halide/alcohol pre-reaction product.

Of these activators, alkoxyalkylaluminum halides and aryloxyalkylaluminum halides are operationally advantageous because an appropriate pot life is obtained even when the catalyst component is incorporated (see, for example, Japanese Unexamined Patent Publication No. 59-51,911). An alkylaluminum halide has a problem in that when the catalyst is incorporated, polymerization is started at once. In this case, the polymerization can be retarded by using a controlling agent such as an ether, an ester, a ketone, a nitrile or an alcohol in combination with the activator (see, for example, Japanese Unexamined Patent Publication No. 58-129,013 and No. 61-120,814). If the controlling agent is not used, the apparatus and operation should be arranged so that even an activator giving a short pot life can be used. A halogenated hydrocarbon such as chloroform, carbon tetrachloride or hexachlorocyclopentadiene can be used in combination with the catalyst and activator (see, for example, Japanese Unexamined Patent Publication No. 60-79,035).

The metathesis catalyst is used in an amount of about 0.01 to about 50 millimoles preferably 0.1 to 10 millimoles, per mole of the norbornene monomer. The activator (cocatalyst) is used at a molar ratio of 0.1 to 200, preferably 2 to 10, to the catalyst component.

Preferably both of the metathesis catalyst and activator are used in the state dissolved in the monomer. The catalyst and activator can be used in the state suspended or dissolved in a small amount of a solvent, if the properties of the product are not degraded to any significant degree.

Dicyclopentadiene Heat-Polymerized Resin

The dicyclopentadiene heat-polymerized resin used in the present invention can be prepared according to the known process which comprises heat-polymerizing a dicyclopentadiene singly or together with a comonomer in the presence or absence of an inert solvent such as benzene, toluene or xylene (see, for example, Japanese Unexamined Patent Publication No. 53-98,383).

As the dicyclopentadiene, there can be mentioned a dicyclopentadiene, a methyl substitution product, an ethyl substitution product and mixtures thereof. As the comonomer, there can be mentioned mono-olefins such as ethylene, propylene, butene, pentene, styrene and a-methylstyrene; conjugated dienes such as 1,3-butadiene, isoprene and 1,3-pentadiene; and polar group-containing vinyl monomers such as vinyl acetate, vinyl propionate, acrylic acid esters, methacrylic acid esters, acrylonitrile and acrolein. Of these comonomers, olefins, conjugated dienes and unsaturated esters are preferred.

A dicyclopentadiene heat-polymerized resin having a softening point of 60° to 200° C., especially 80° to 180° C., is preferably used.

The mixing ratio between the dicyclopentadiene and the comonomer is such that the amount of the dicyclopentadiene is 100 to 50% by weight, preferably 100 to 60% by weight, and the amount of the comonomer is 0 to 50% by weight, preferably 0 to 40% by weight.

In the present invention, the dicyclopentadiene heat-polymerized resin is incorporated in an amount of 15 to 150 parts by weight, preferably 20 to 100 parts by weight, per 100 parts by weight of the norbornene monomer. If the amount of the dicyclopentadiene heat-polymerized resin is smaller than 15 parts by weight, the effect of improving the flexural modulus of elasticity is insufficient and also the improvement of the filler dispersibility is insufficient. If the amount of the dicyclopentadiene heat-polymerized resin exceeds 150 parts by weight, the formed polymer becomes brittle and no good results can be obtained.

If the dicyclopentadiene heat-polymerized resin is incorporated, the resin exerts the function of lowering the solidification point of the monomer-containing reaction liquid. Accordingly, even if a monomer having a high solidification point is used, the monomer-containing reaction liquid is not solidified, and the operation adaptability to the reaction injection molding is improved. If the viscosity of the monomer-containing reaction liquid is too low, the viscosity can be adjusted to an appropriate level by incorporation of a dicyclopentadiene resin.

In the present invention, by adding the dicyclopentadiene polymerized resin at the above-mentioned specific mixing ratio to the norbornene monomer and bulk-polymerizing the mixture in a mold in the presence of the metathesis catalyst system, a thermosetting resin having an improved flexural modulus of elasticity can be obtained without dropping of the glass transition point (Tg). In this case, even if a filler such as a glass fiber is added, a thermosetting resin in which the filler is uniformly dispersed can be obtained.

As pointed out hereinbefore, it is known that in the RIM method using a norbornene monomer, an elastomer and a heat-polymerized dicyclopentadiene resin are used in combination (see Japanese Unexamined Patent Publication No. 58-129,013). However, in this known process, the amount of the dicyclopentadiene heat-polymerized resin incorporated is 10% by weight at largest, and the modifying effect by this heat-polymerized resin is not specifically disclosed. In contrast, if the dicyclopentadiene heat- polymerized resin is incorporated in an amount much larger than in the conventional process, that is, in an amount of 15 to 150 parts by weight per 100 parts by weight of the monomer, surprisingly, a thermosetting resin having an improved flexural modulus of elasticity and an excellent filler dispersibility can be obtained while retaining a high distortion temperature (glass transition point).

In general, the dicyclopentadiene heat-polymerized resin is used in the state dissolved in the reaction solution containing the norbornene monomer.

Polymerization Conditions

In the present invention, a thermosetting resin is prepared according to the polymerization process in which the norbornene monomer is introduced into a mold having a predetermined shape and bulk polymerization is carried out in the mold in the presence of the metathesis catalyst system. It is sufficient if the polymerization is substantially bulk polymerization, and a small amount of an inert solvent may be present.

According to a preferred embodiment of the process for the preparation of a thermosetting resin, the norbornene monomer is divided in two liquids, the liquids are charged in different vessels, the metathesis catalyst is added to one liquid and the activator is added to the other liquid to prepare two stable reaction solvents. A predetermined amount of the dicyclopentadiene heat-polymerized resin may be incorporated and dissolved in one or both of the reaction solutions. However, preferably the dicyclopentadiene heat-polymerized resin be added to both of the reaction solutions so that the viscosities of both reaction liquids are maintainted substantially at the same level, because both reaction liquids can be uniformly mixed at the subsequent step. Then, the two reaction solutions are mixed together, and the mixture is cast in a mold maintained at a high temperature, where bulk ring-opening polymerization is advanced to obtain a thermosetting resin.

In the present invention, the known impinging mixing apparatus heretofore used as the RIM apparatus can be used for mixing the two reaction solutions. In this case, the vessel containing one of the two reaction solutions and the vessel containing the other solution act as different flow supply sources. The two flows are instantaneously mixed at the mixing head of the RIM machine, and the mixture is cast in the mold maintained at a high temperature where bulk polymerization is instantaneously effected to obtain a thermosetting resin.

The impinging mixing apparatus can be used in the above-mentioned manner, but the mixing means that can be used in the present invention is not limited to this mixing apparatus. Where the pot life at room temperature is as long as one hour, there may be adopted a method in which after completion of mixing of the two reaction solutions in a mixer, the mixture is injected or cast in a preliminarily heated mold once or several times (see, for example, Japanese Unexamined Patent Publication No. 59-51,911). This method is advantageous in that the size of the mixing apparatus can be reduced as compared with the size of the impinging mixing apparatus and the operation can be performed under a lower pressure.

The process of the present invention is not limited to the embodiment in which two reaction solutions are used. As is readily understood by persons with ordinary skill in the art, there can be adopted various modifications, for example, a method in which a reaction liquid and an additive are charged in a third vessel and the mixture is used as a third flow.

The mold temperature is at least 50° C., preferably 60° to 200° C., especially preferably 90° to 130° C. The mold pressure is ordinarily in the range of from 0.1 to 100 kg/cm$^2$.

The polymerization time can be appropriately selected, but in general, the polymerization time is shorter than about 20 minutes, preferably not longer than 5 minutes. However, a longer time may be adopted.

The components to be subjected to the polymerization should be stored in an atmosphere of an inert gas such as nitrogen gas and the operation should be performed in this inert gas atmosphere. The mold may be sealed with an inert gas, but this sealing is not indispensable.

Properties of Thermosetting Resin

The bulky polymer obtained according to the process of the present invention is a thermosetting resin which becomes a hard solid on cooling. The flexural modulus of elasticity of the resin is at least 20,000 kg/cm$^2$, preferably at least 25,000 kg/cm$^2$, and the resin has excellent mechanical strength.

Optional Components

The characteristics of the thermosetting resin of the present invention can be improved by incorporating various additives such as a filler, an antioxidant, a pigment, a colorant and an elastomer.

The additives are added to one or both of the reaction solutions or charged in the cavity of the mold.

As the filler, there can be used inorganic fillers such as glass, carbon black, talc, calcium carbonate and mica.

The impact resistance of the thermosetting resin obtained according to the present invention is somewhat lower than that of the resin obtained when the dicyclopentadiene heat-polymerized resin is not made present, but if an elastomer is used in combination with the dicyclopentadiene heat-polymerized resin, the impact strength of the thermosetting resin can be increased. In general, the elastomer is incorporated in an amount 0.5 to 20 parts by weight, preferably 1 to 15 parts by weight, per 100 parts by weight of the norbornene monomer. If the amount of the elastomer incorporated is too small, the effect of improving the impact resistance is insufficient. If the amount of the elastomer incorporated is too large, the viscosity of the reaction liquid is too high and the operation adaptability to molding is degraded, and moreover, the heat distortion temperature or the flexural modulus of elasticity of the thermosetting resin composition is degraded. As means for adding the elastomer, there is ordinarily adopted a method in which the elastomer is incorporated and dissolved in one or both of the reaction solutions.

As the elastomer, there can be mentioned a natural rubber, polybutadiene, polyisoprene, a styrene/butadiene copolymer (SBR), a styrene/butadiene/styrene block copolymer (SBS), a styrene/isoprene/styrene copolymer (SIS), an ethylene/propylene/diene terpolymer (EPDM), an ethylene/vinyl acetate copolymer (EVA), and hydrogenation products thereof.

EXAMPLES

The present invention will now be described in detail with reference to the following examples and referential examples that by no means limit the scope of the invention. All of "parts" and "%" in the examples are by weight.

REFERENTIAL EXAMPLE 1 (PREPARATION OF HEAT-POLYMERIZATION RESIN)

An autoclave having a capacity of 1 liter was charged with 300 g of dicyclopentadiene (DCP) having a purity of 98.5%, 300 g of xylene and 500 ppm of 2,6-ditertiarybutylphenol (BHT), and heating reaction was carried out at 255° C. for 4 hours in a nitrogen gas atmosphere. Unreacted DCP and xylene were purged by nitrogen gas. The softening point of the so-obtained DCP resin was 160° C.

EXAMPLE 1

A DCP solution containing a predetermined amount of the heat-polymerized DCP resin was charged into two vessels, and in one vessel, diethylaluminum chloride and n-propanol were added at concentrations of 33 millimoles and 49.5 millimoles, respectively, per litre of the heat-polymerized DCP resin (liquid A). In the other vessel, tri(tridecyl) ammonium molybdate was added at a concentration of 4 millimoles per liter of the heat-polymerized DCP resin (liquid B).

Both reaction liquids were mixed at a ratio of 1/1. The pot life of this starting liquid was longer than 1 hour at 30° C.

The mixture of both liquids was promptly cast in a mold, which had a cavity volume of 200 mm×200 mm×2 mm and was heated at 90° C., by using a gear pump and a power mixer. Reaction was conducted in the mold for about 3 minutes. The series of these operations were conducted in a nitrogen atmosphere.

Thermosetting resin molded articles were similarly prepared by incorporating the heat-polymerized DCP resin at various mixing ratios. The physical properties of the obtained resin molded articles are shown in Table 1.

TABLE 1

|  | Comparative Examples | | Examples of Present Invention | | |
|---|---|---|---|---|---|
| DCP/heat-polymerized DCP resin ratio | 100/0 | 100/10 | 100/30 | 100/70 | 100/120 |
| Tg (°C.) | 85 | 90 | 105 | 115 | 125 |
| Flexural Modulus of elasticity (kg/cm2) | 19,000 | 20,000 | 25,000 | 28,000 | 30,000 |
| Viscosity of composition (cps/35° C.) | 5 | 40 | 120 | 460 | 1,200 |
| Solidification point (°C.) | 35 | 17 | 0 | 0 | 0 |

REFERENTIAL EXAMPLE 2

Heat-copolymerized resins were obtained in the same manner as described in Referential Example 1 except that starting materials having a composition shown in Table 2 were used. The softening points of these resins are shown in Table 2.

TABLE 2

| Composition of starting material | Softening point (°C.) |
|---|---|
| DCP/piperylene = 75/25 | 145 |
| DCP/isoprene = 75/25 | 130 |
| DCP/styrene = 75/25 | 135 |
| DCP/vinyl acetate = 75/25 | 125 |

EXAMPLE 2

Molded articles were obtained in the same manner as described in Example 1 except that compositions comprising DCP and the heat-copolymerized resin obtained in Referential Example 2 and DCP at a ratio of 100 parts/40 parts was used. The physical properties of the compositions and molded articles are shown in Table 3.

TABLE 3

| Composition of heat-copolymerized resin | DCP/ piperylene | DCP/ isoprene | DCP/ styrene | DCP/vinyl acetate |
|---|---|---|---|---|
| Viscosity of composition (cps/35° C.) | 200 | 200 | 250 | 190 |
| Solidification point of composition (°C.) | 0J | 0J | 0J | 0J |
| Tg of molded article (°C.) | 90 | 90 | 95 | 83 |
| Flexural modulus of elasticity (kg/cm$^2$) | 26,000 | 25,500 | 26,500 | 24,500 |

EXAMPLE 3

Molded articles were prepared in the same manner as described in Example 2 except that the kind of the norbornene monomer was changed while the amount of the heat-polymerized DCP resin obtained in Referential Example 1 was fixed to 30 parts. The results are shown in Table 4.

TABLE 4

| Heat-Polymerized DCP resin/DCP/methyltetracyclododecene (mixing ratio) | 30/50/50 | 30/70/30 |
|---|---|---|
| Tg (°C.) | 130 | 120 |
| Flexural elastic modulus (kg/cm$^2$) | 27,000 | 26,500 |

EXAMPLE 4

The heat-polymerized DCP resin obtained in Referential Example 1 was mixed with DCP at a predetermined mixing ration, and 18% of a glass flake (CEF-048 supplied by Nippon Glass Fiber) was added to the composition. The resulting reaction liquid was charged in a test tube having a diameter of 2 cm so that the height of the charged reaction was about 10 cm. The sedimentation of the glass flake was observed. The results are shown in Table 5.

TABLE 5

|  | Comparative Example | Example of Present Invention |
|---|---|---|
| Heat polymerized DCP resin/DCP (mixing ratio) | 0/100 | 40/100 |
| Viscosity before addition of glass flake (cps/35° C.) | 5 | 200 |
| Viscosity just after addition of glass flake (cps/35° C.) | 1000 | 5000 |
| Sedimentation ratio after 2 hours' standing (%) | 32 | 2 |

In the molded article obtained in the same manner as described in Example 1 from the sample of the present invention, the glass flake was uniformly dispersed.

EXAMPLE 5

To 100 parts of a mixture comprising 100 parts of DCP and 40 parts of the heat-polymerized DCP resin obtained in Referential Example 1 was added a styrene/isoprene/styrene block copolymer (Kraton 1170 supplied by Shell Chemicals; hereinafter referred to as "SIS") as the elastomer at a predetermined ratio, and a molded article was prepared from this composition in the same manner as described in Example 1. The glass transition point, flexural modulus of elasticity and Izod impact strength (notched) of the molded article were measured. The obtained results are shown in Table 6.

TABLE 6

| SIS/(DCP + heat-polymerized DCP resin) | 0/100 | 5/100 | 10/100 | 15/100 |
|---|---|---|---|---|
| Tg (°C.) | 110 | 110 | 108 | 109 |
| Flexural elastic modulus (kg/cm$^2$) | 26,500 | 25,500 | 24,000 | 22,000 |
| Izod impact strength (kg · cm/cm) | 4 | 18 | 25 | 25 |

EXAMPLE 6

A molded article was prepared in the same manner as described in Example 5 except that 5 parts of an elastomer shown below was added to 100 parts of a mixture comprising 100 parts of DCP and 40 parts of the heat-polymerized DCP resin obtained in Referential Example 1. The elastomer used and the properties of the molded article are shown in Table 7.

TABLE 7

| | Examples of Present Invention | | | | |
|---|---|---|---|---|---|
| Kind of elastomer* | EVA | SBS | SEBS | EPDM | SBR |
| Tg (°C.) | 109 | 110 | 111 | 112 | 108 |
| Flexural elastic modulus (kg/cm$^2$) | 22,500 | 23,000 | 24,500 | 25,000 | 22,000 |
| Izod impact strength (kg · cm/cm) | 18 | 17 | 26 | 20 | 15 |

Note
EVA: Evatate R5011 supplied by Sumitomo Chemical
SBS: Kraton TR-1101 supplied by Shell Chemical
SEBS: Kraton G-1650 supplied by Shell Chemical (hydrogenated SBS)
EPDM: EP-65X supplied by Japanese Synthetic Rubber
SBR: Nipol 1502 supplied by Nippon Geon According to the present invention, by the combined use of a norbornene monomer with a dicyclopentadiene heat-polymerized resin, a thermosetting resin having a higher heat distortion temperature than those of the conventional polymers and having excellent flexural modulus of elasticity and filler dispersibility can be obtained economically advantageously. Furthermore, there can be attained such an excellent effect that this resin can be used in various fields where heat resistance and mechanical strength are required.

We claim:

1. A process for the preparation of a thermosetting resin which comprises bulk-polymerizing a a monomer charge comprising cyclic olefin monomer containing a norbornene ring and mixtures thereof in a mold in the presence of a metathesis catalyst system, characterized in that the polymerization reaction is carried out in the presence of a dicyclopentadiene heat-polymerized resin said resin containing up to 50% comonomer and having softening point of 60° to 200° C. in an amount of 15 to 150 parts by weight per 100 parts by weight of said monomer charge.

2. A process of the preparation of a thermosetting resin according to claim 1, wherein the dicyclopentadiene heat-polymerization resin is a polymer of dicyclopentadiene.

3. A process of the preparation of a thermosetting resin according to claim 1, wherein the dicyclopentadiene heat-polymerized resin is a copolymer of dicyclopendadiene with a comonomer.

4. A process for the preparation of a thermosetting resin according to claim 1, wherein the polymerization reaction is carried out in the presence of said dicyclopentadiene heat-polymerized resin and an elastomer.

5. A process for the preparation of a thermosetting resin which comprises bulk-polymerizing monomer charge comprising a cyclic olefin monomer containing a norbornene ring and mixtures thereof in a mold in the presence of a metathesis catalyst system, characterized in that the polymerization reaction is carried out in the presence of a dicyclopentadiene heat-polymerized resin said resin containing up to 50% comonomer and having softening point of 60° to 200° C. in an amount of 20 to 100 parts by weight per 100 parts by weight of said monomer charge.

6. A process for the preparation of a thermosetting resin according to claim 5 wherein the dicyclopentadiene heat-polymerized resin is a polymer of a dicyclopentadiene.

7. A process for the preparation of a thermosetting resin according to claim 5 wherein the dicyclopentadiene heat-polymerized resin is a copolymer of a dicyclopentadiene with up to 40% by weight of a comonomer.

8. A process for the preparation of a thermosetting resin according to claim 5 wherein the polymerization reaction is carried out in the presence of the dicyclopentadiene heat-polymerized resin and an elastomer.

9. A process for the preparation of a thermosetting resin according to claim 5 wherein said cyclic olefin monomer is selected from substituted and unsubstituted norbornenes, dicyclopentadiene, dihydrodicyclopentadiene, tricyclopentadiene, tetracyclopentadiene, tetracyclodedecene, and mixtures thereof.

10. A process for the preparation of a thermosetting resin according to claim 5 wherein said cyclic olefin monomer is dicyclopentadiene; and wherein said catalyst system is selected from a catalyst and a cocatalyst, said catalyst is selected from molybdenum halides, tungsten halides, organic ammonium salts of molybdenum, organic ammonium salts of tungsten, organic ammonium salts of tantalum, and mixtures thereof, and said cocatalyst is selected from alkoxyalkylaluminum halides, aryloxyalkylaluminum halides, organic tin compounds, and mixtures thereof.

* * * * *